United States Patent
Kim

[19]

[11] Patent Number: 6,166,497
[45] Date of Patent: Dec. 26, 2000

[54] ELECTRONIC CONTROL SYSTEM FOR LIGHTING LAMPS

[75] Inventor: Jihn Kuk Kim, Seoul, Rep. of Korea

[73] Assignee: Haga Electronics Co., Ltd., Seoul, Rep. of Korea

[21] Appl. No.: 09/310,583

[22] Filed: May 12, 1999

[51] Int. Cl.[7] .................................................. H05B 37/02
[52] U.S. Cl. ........................... 315/362; 315/291; 315/294
[58] Field of Search ................................. 315/294, 292, 315/293, 296, 308, 312, 316, 317, 291, 362; 307/31

[56] References Cited

U.S. PATENT DOCUMENTS

| | | | |
|---|---|---|---|
| 4,213,063 | 7/1980 | Jones, Sr. | 307/141 |
| 5,264,761 | 11/1993 | Johnson | 315/291 |
| 5,811,940 | 9/1998 | Nutzel | 315/291 |

*Primary Examiner*—David Vu
*Assistant Examiner*—Ephrem Alemu
*Attorney, Agent, or Firm*—Shlesinger, Arkwright & Garvey LLP

[57] ABSTRACT

A system for electronically controlling a plurality of lighting lamps, comprising a power switch part installed on the same indoor or outdoor wirings of a different place from the lighting lamps, the power switch part supplying alternating current power to the system and performing a switching operation under the control of the user to generate a power control signal, and an electronic lighting lamp control part including a pulse signal generator for generating a pulse signal in response to the power control signal from the power switch part, a pulse signal separator for separating the pulse signal from the pulse signal generator to generate a lighting control signal sensible by the system, a controller for determining, in response to the lighting control signal from the pulse signal separator, whether the lamps are to be turned on or off and turning on or off the lamps in order or all of them at a time in accordance with the determined results, and a power supply circuit for supplying desired direct current power to the components in the system. According to the present invention, only one wall switch is manipulated without changing the existing wiring for the switch and the existing wiring for the lamps at a ceiling, to turn on or off the lamps in order.

2 Claims, 3 Drawing Sheets

ELECTRONIC CONTROL SYSTEM FOR LIGHTING LAMPS

BACKGROUND OF THE INVENTION

1. Field of the Invention

The present invention relates in general to an electronic lighting lamp control system for controlling a plurality of lighting lamps, and more particularly to an electronic lighting lamp control system which is capable of turning on or off a plurality of lighting lamps in a room one by one in order or all of them at a time according to the number of manipulations of a switch mounted to a wall, so that the lamps can be conveniently controlled without changing the existing wiring for the switch and the existing wiring for the lamps at a ceiling.

2. Description of the Prior Art

FIG. 1 is a circuit diagram showing the construction of a conventional lighting lamp control system. As shown in this drawing, the lighting lamp control system comprises an on/off wall switch 1 turned on to supply system drive power, and a lamp switching pull string 2 for manually switching states of first and second lamps L1 and L2 mounted on a ceiling.

The pull string 2 is connected to an interlocking switch part 3, which is composed of a first switch SW1 connected to the first lamp L1 and a second switch SW2 connected to the second lamp L2.

The operation of the conventional lighting lamp control system with the above-mentioned construction will hereinafter be described.

If the on/off wall switch 1 is turned on, the drive power is continuously supplied to the system. Then, if the lamp switching pull string 2 is pulled downwardly according to a user's selection, only the first lamp L1 is turned on. If the pull string 2 is pulled downwardly once more, the second lamp L2 is turned on at the same time that the first lamp L1 is turned off.

If the lamp switching pull string 2 is pulled once again, both the first and second lamps L1 and L2 are turned on. Then, if the pull string 2 is pulled once more, both the first and second lamps L1 and L2 are turned off.

As mentioned above, in the conventional lighting lamp control system, the switches for controlling the plurality of lighting lamps are installed in two places, or the wall and ceiling. For this reason, it is necessary for the user to manipulate all the switches situated on both the wall and ceiling, resulting in an inconvenience in turning on the lamps. Further, when the user pulls the lamp switching pull string 2 hung down from the ceiling, the lamps may shake or otherwise be moved under the force of pulling downward on the pull string 2. This causes the user concern or uneasiness and provides an aesthetically unappealing sight.

Furthermore, it is very hard for the user to use the lamp switching pull string 2 to switch states of the lamps if the user is a child or in poor health or the ceiling is very high, because the pull string 2 may be out of reach.

SUMMARY OF THE INVENTION

Therefore, the present invention has been made in view of the above problems, and it is an object of the present invention to provide an electronic control system for lighting lamps, in which only one wall switch is manipulated without changing the existing wiring for the switch and the existing wiring for the lamps at a ceiling, to turn on or off the lamps in order, resulting in a simplicity in construction and use and an increase in price competitiveness of products.

In accordance with the present invention, the above and other objects can be accomplished by a provision of a system for electronically controlling a plurality of lighting lamps, comprising a unique power switch means installed on the same indoor or outdoor wirings of a different place from the lighting lamps, the power switch means supplying alternating current power to the system and performing a switching operation under the control of the user to generate a power control signal; and a unique electronic lighting lamp control means including a pulse signal generator for generating a pulse signal in response to the power control signal from the power switch means, a pulse signal separator for separating the pulse signal from the pulse signal generator to generate a lighting control signal sensible by the system, a controller for determining, in response to the lighting control signal from the pulse signal separator, whether the lamps are to be turned on or off and turning on or off the lamps in order or all of them at a time in accordance with the determined results, and a power supply circuit for supplying desired direct current power to the components in the system.

Preferably, the power switch means may include a wall switch and a coil connected in parallel.

The pulse signal generator may generate the pulse signal based on a counter electromotive force from the coil during the wall switch is off.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
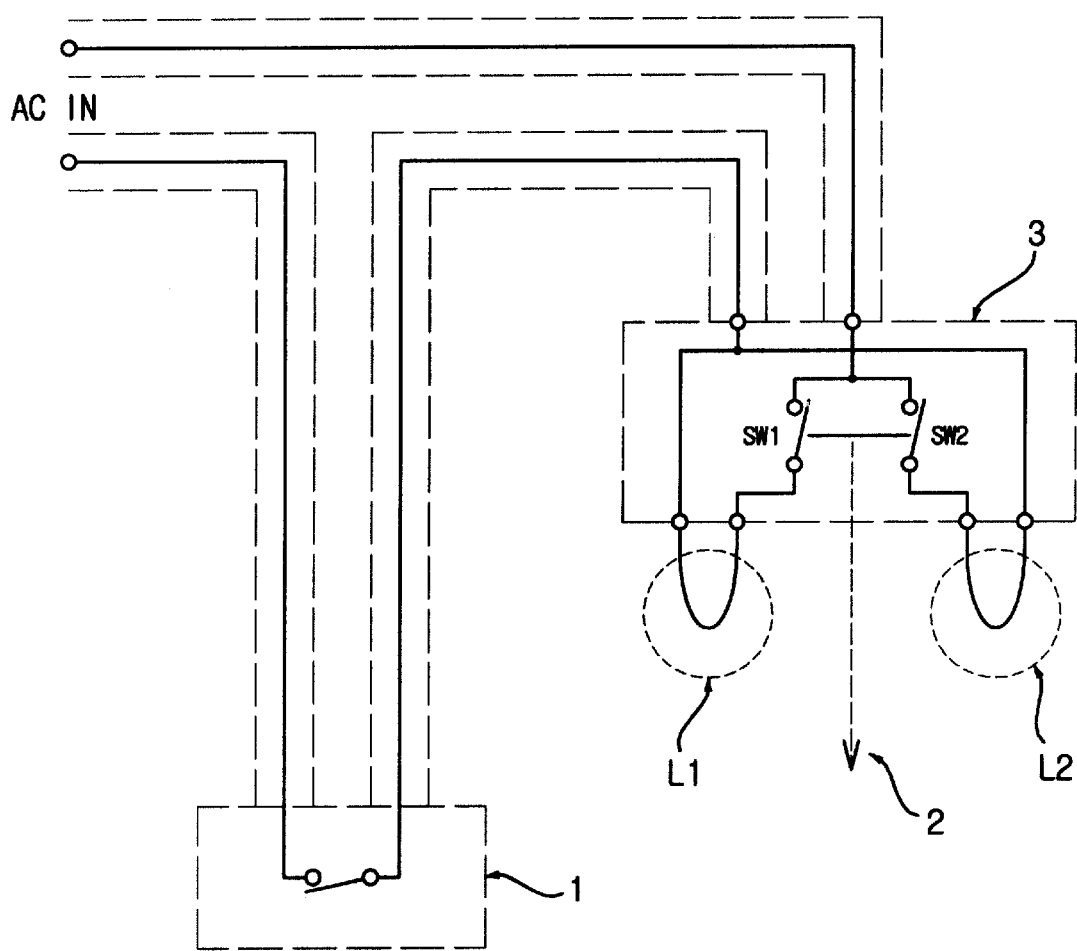
FIG. 1 is a circuit diagram showing the construction of a conventional lighting lamp control system.
Figure 2:
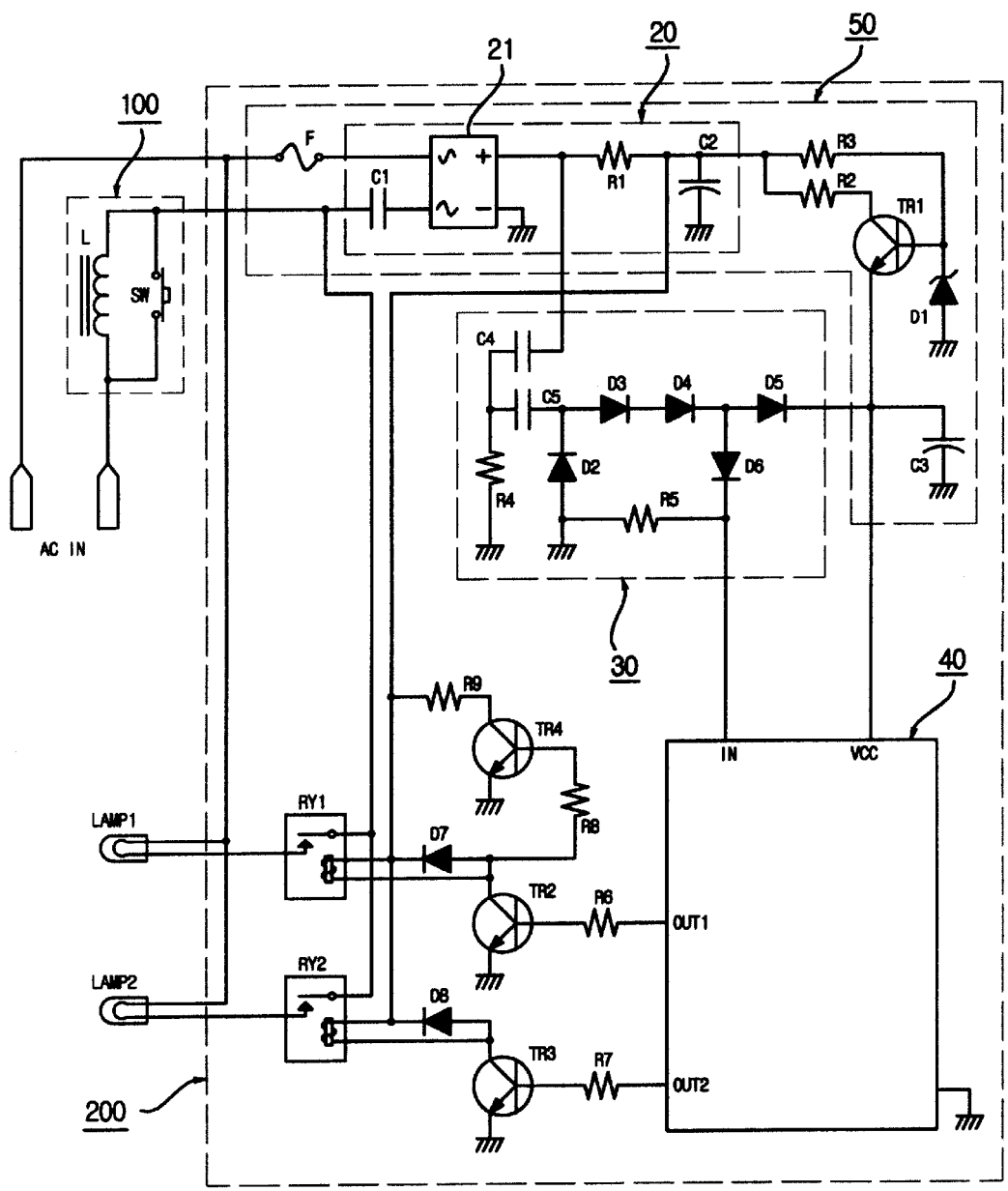
FIG. 2 is a circuit diagram showing the construction of an electronic control system for lighting lamps in accordance with the present invention.

FIG. 2 is a circuit diagram showing the construction of an electronic control system for lighting lamps in accordance with the present invention. As shown in this drawing, the electronic control system comprises a power switch part 100 for supplying alternating current (AC) power to the system, and an electronic lighting lamp control part 200. The power switch part 100 is manipulated under the control of the user to generate a power control signal. To this end, the power switch part 100 includes a coil L and a wall switch SW connected in parallel. The electronic lighting lamp control part 200 includes a pulse signal generator 20, pulse signal separator 30, controller 40 and power supply circuit 50. The pulse signal generator 20 generates a pulse signal in response to the power control signal from the power switch part 100. This pulse signal generator generates a pulse signal during the wall switch SW is off. The pulse signal separator 30 separates the pulse signal from the pulse signal generator 20 to generate a lighting control signal which is composed of pulses with a constant level sensible by the system. The controller 40 determines, in response to the lighting control signal from the pulse signal separator 30, whether first and second lamps LAMP1 and LAMP2 are to be turned on or off and generates first and second lamp drive signals in accordance with the determined results to turn on or off the first and second lamps LAMP1 and LAMP2 in order or both of them at a time. The power supply circuit 50 is adapted to supply desired direct current (DC) power to the components in the system.

The pulse signal generator 20 in the electronic lighting lamp control part 200 includes a first capacitor C1, bridge rectifier 21, first resistor R1 and second capacitor C2. The bridge rectifier 21 has its one input terminal connected to an AC power source through a fuse F and its other input terminal for inputting the power control signal from the power switch part 100 through the first capacitor C1. The bridge rectifier 21 further has its inverting (−) output terminal connected to a ground voltage terminal and its non-inverting (+) output terminal connected to the first resistor R1 and second capacitor C2. When the wall switch SW is off, the pulse signal generator 20 generates the pulse signal, which has a high level pulse duration in response to a counter electromotive force being produced whenever the direction of current through the coil L is changed at an interval of, for example, 120 Hz.

The pulse signal separator 30 in the electronic lighting lamp control part 200 is composed of fourth and fifth capacitors C4 and C5, fourth and fifth resistors R4 and R5 and second to sixth diodes D2, D3, D4, D5 and D6. The pulse signal separator 30 separates the pulse signal from the pulse signal generator 20 to generate the lighting control signal, which is then fed to an input terminal of the controller 40.

Whenever the wall switch SW in the power switch part 100 is manipulated by the user, the controller 40 in the electronic lighting lamp control part 200 receives the lighting control signal from the pulse signal separator 30, which has pulses constant in level. Then, the controller 40 analyzes the received lighting control signal to determine the number of manipulations of the wall switch SW by the user.

In other words, if the controller 40 determines, as a result of the lighting control signal analysis, that the wall switch SW has initially been manipulated by the user, it turns on only the first lamp LAMP1. If the controller 40 determines that the wall switch SW has twice been manipulated, it turns on the second lamp LAMP2 at the same time that it turns off the first lamp LAMP1. In the case where the controller 40 determines that the wall switch SW has three times been manipulated, it turns on both the first and second lamps LAMP1 and LAMP2. If the controller 40 determines that the wall switch SW has four times been manipulated, it turns off both the first and second lamps LAMP1 and LAMP2.

A various number of lamps may be used in the system, in addition to the first and second lamps LAMP1 and LAMP2. As the number of lamps to be used is increased, the number of manipulations of the wall switch SW by the user is increased and a significant amount of time is required in going through all the stages in order to turn off all the lamps. In this regard, it is preferred to select a proper number of lamps.

In FIG. 2, the reference numerals RY1 and RY2, not described, denote first and second relays for switching the first and second lamps LAMP1 and LAMP2, respectively, TR1 to TR4 denote first to fourth transistors, respectively, R1 to R9 denote first to ninth resistors, respectively, and D2 to D8 denote second to eighth diodes, respectively.

Figure 3:
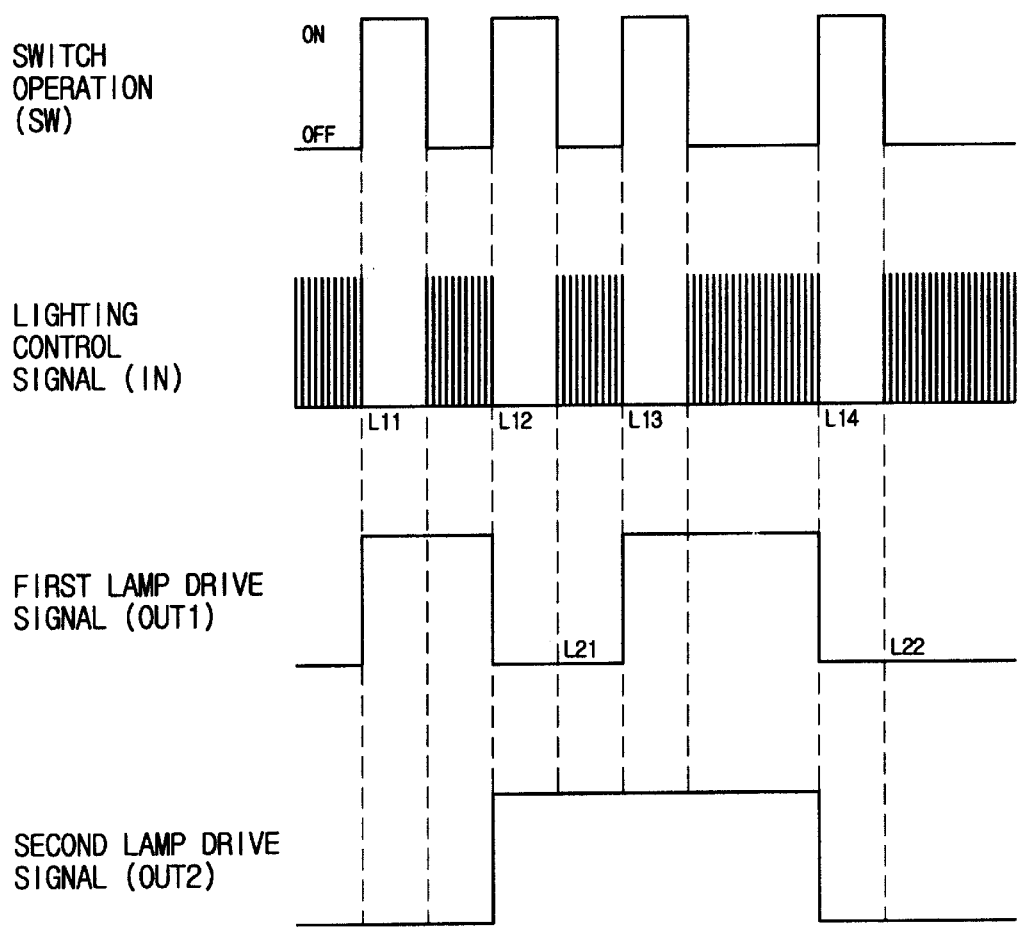
FIG. 3 is a timing diagram of pulse signals for the control of the lighting lamps in FIG. 2.

Noticeably, the lighting control signal, which is used for the determination about whether the first and second lamps LAMP1 and LAMP2 are to be turned on or off, is composed of pulses produced at an interval of a predetermined period (for example, 120 Hz) during the wall switch SW is off, as shown in FIG. 3. If the wall switch SW is turned on, the lighting control signal goes low in level without pulse train.

When the lighting control signal initially goes low in level, the controller 40 outputs the first lamp drive signal. The first lamp drive signal remains high in level from the starting point of a first low level duration L11 of the lighting control signal until the starting point of a second low level duration L12 of the lighting control signal. Then, the first lamp drive signal remains low in level from the starting point of the second low level duration L12 of the lighting control signal until the starting point of a third low level duration L13 of the lighting control signal. Then, the first lamp drive signal remains again high in level from the starting point of the third low level duration L13 of the lighting control signal until the starting point of a fourth low level duration L14 of the lighting control signal. Namely, the first lamp drive signal repeats the above level transition operation to switch the on and off states of the first lamp LAMP1. The first lamp LAMP1 is turned on when the first lamp drive signal goes high in level and off when the first lamp drive signal goes low in level.

The controller 40 outputs the second lamp drive signal, which makes a low to high level transition at the starting point of a first low level duration L21 of the first lamp drive signal, or the starting point of the second low level duration L12 of the lighting control signal. The second lamp drive signal remains high in level until the starting point of the fourth low level duration L14 of the lighting control signal. The second lamp LAMP2 is switched in its operation state by the second lamp drive signal in such a manner that it can be turned on only when the second lamp drive signal becomes high in level.

In the case where the first and second lamp drive signals are both high in level, the first and second lamps LAMP1 and LAMP2 are both on. Similarly, when the first and second lamp drive signals are both low in level, the first and second lamps LAMP1 and LAMP2 are both off.

The power supply circuit 50 is adapted to supply the desired DC power to the components in the system. To this end, the power supply circuit 50 is provided with the fuse F, first to third capacitors C1–C3, bridge rectifier 21, first to third resistors R1–R3, first transistor TR1 and zener diode D1.

The operation of the electronic lighting lamp control system with the above-mentioned construction in accordance with the present invention will hereinafter be described in more detail.

In the preferred embodiment of the electronic lighting lamp control system of the present invention, the on/off states of the wall switch SW can be transferred to the system while commercial AC power is supplied to the system. The system uses the commercial AC power for the control of the first and second lamps LAMP1 and LAMP2 and for itself and senses the on/off states of the wall switch SW.

In other words, the power switch part 100 with the coil L and wall switch SW connected in parallel generates the power control signal in response to manipulations of the wall switch SW by the user and transfers it to the pulse signal generator 20 in the electronic lighting lamp control part 200. Upon receiving the power control signal from the power switch part 100, the pulse signal generator 20 generates the pulse signal only when the wall switch SW is off.

The pulse signal separator 30 separates the pulse signal from the pulse signal generator 20 to generate the lighting control signal, which is composed of pulses with a constant level sensible by the system. Then, the pulse signal separator 30 outputs the lighting control signal to the controller 40. The controller 40 analyzes the lighting control signal from the pulse signal separator 30 to determine the number of manipulations of the wall switch SW by the user. As a result of the determination, the controller 40 generates the first and second lamp drive signals to turn on or off the first and second lamps LAMP1 and LAMP2 in order or both of them at a time.

Accordingly, on the basis of the number of manipulations of the wall switch SW by the user, the first lamp LAMP1 is turned on, and the second lamp LAMP2 is then turned on at the same time that the first lamp LAMP1 is turned off. If the following manipulation of the wall switch SW by the user is sensed, both the first and second lamps LAMP1 and LAMP2 are turned on. Finally, when the AC power is blocked to the system or when the wall switch SW is manipulated once more by the user, under the condition that the first and second lamps LAMP1 and LAMP2 are on, both the first and second lamps LAMP1 and LAMP2 are turned off.

As apparent from the above description, according to the present invention only one wall switch is manipulated without changing the existing wiring for the switch and the existing wiring for the lamps at a ceiling, to turn on or off the lamps In order. Therefore, the electronic lighting lamp control system of the present invention has the effect of providing a simplicity in construction and use and increasing the price competitiveness of products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic control system for controlling a plurality of lighting lamps operated by AC power supply through a power switch, comprising:

a) a coil for being connected in parallel to the power switch;

b) a pulse generator for being connected to the power switch, said pulse generator to generate a pulse signal when the power switch is off in response to a counter electromotive force being produced whenever the direction of current through said coil changes;

c) a pulse signal separator to generate a lighting control signal from the pulse signal, said lighting control signal having a high level when the power switch is off and a low level when the power switch is on; and d) a controller to determine in response to said lighting control signal whether the lamps are to be turned on or off in accordance with a predetermined order.

2. An electronic control system for lighting lamps operated by AC power supply through a power switch, comprising:

a) an electronic circuit for being connected to the power supply, said electronic circuit including a pulse signal generator connected to a pulse separator to generate a control signal which has a high level when the power switch is off and a low level when the power switch is on;

b) a controller to determine in response to the control signal whether the lamps are to be turned on or off in accordance with a predetermined order; and c) said pulse generator including a coil to be connected in parallel to the power switch, said pulse signal having a high level in response to a counter electromotive force being produced whenever the direction of current through said coil changes.

* * * * *